Patented May 29, 1934

1,960,298

UNITED STATES PATENT OFFICE

1,960,298

FLUID COMPOSITION

George L. Doelling, St. Louis, Mo., assignor to Wagner Electric Corporation, St. Louis, Mo., a corporation of Delaware No Drawing. Application July 22, 1933, Serial No. 681,764

3 Claims. (Cl. 252—5)

My invention relates to a fluid composition suitable for use in fluid pressure devices such as hydraulic actuating equipment for vehicle brakes.

As is known, fluid for this service must have a number of special characteristics, among which are that it have lubricating qualities, a high gassing point (on account of the heat developed in vehicle braking apparatus under present day conditions as to vehicle speeds and brake diameters), and a low solidifying point. It is also important that it not adversely affect the rubber piston sealing elements or be corrosive to metals of the kind used in the manufacture of the apparatus, including the fluid conduits.

It has heretofore been proposed to utilize as a hydraulic brake fluid, a mixture of castor oil and monoethyl ether of ethylene glycol, but such mixture does not meet the above requirements regardless of the relative proportions of these ingredients which may be used. In a mixture of 50% castor oil and 50% of this glycol ether, the viscosity characteristics are satisfactory but the fluid causes the rubber piston sealing cups to swell and to otherwise deteriorate, especially at high temperatures. Reduction of the glycol ether content to approximately 35% eliminates practically all of the adverse effects upon rubber, but a fluid containing 65% of castor oil is entirely too viscous for operating purposes, particularly under conditions of low temperature.

I have conceived the idea of forming a fluid which has a castor oil content not substantially exceeding 50%, a glycol ethyl ether content not substantially exceeding 35%, and for the remainder of the fluid to employ another liquid which is inert to rubber and metal and does not interact with the castor oil or the glycol. I have found that toluene sulfonyl ethylamid is suitable for this purpose, and that a fluid comprising castor oil 50% by volume, ethyl ether of ethylene glycol 35% by volume, toluene sulfonyl ethylamid 15% by volume, and approximately 1 gram per gallon of potassium arsenite, exhibits more desirable characteristics for use in hydraulic braking mechanism than any heretofore known to me. The gassing point of this fluid is over 250° Fahr. and the freezing point substantially below zero. The toluene sulfonyl ethylamid used is a mixture of ortho toluene sulfonyl ethylamid and para toluene sulfonyl ethylamid. The methyl derivatives can also be used. In place of the ethyl derivatives other alkyl derivatives can be used when the alkyl group has less than 6 carbon atoms. Also, there is advantage in using amid derivatives of two or more different alkyl groups, as for instance, approximately 5% by volume of each of ortho and para toluene sulfonyl ethylamids, and approximately 2½% by volume of each of the ortho and para toluene sulfonyl methyl amids can be used in place of the 15% of toluene sulfonyl ethylamid in the above example. Instead of potassium arsenite as an agent for neutralization of acidity, other substances such as potassium hydroxide can be used.

Having fully described my invention, what I claim as new and desire to secure by Letters Patent of the United States is:

1. An operating liquid for fluid pressure apparatus comprising castor oil, a mixture of toluene sulfonyl alkyl amids, (the alkyl group having less than 6 carbon atoms) and monoethyl ether of ethylene glycol.

2. An operating liquid for fluid pressure apparatus comprising castor oil in substantially 50 parts by volume, monoethyl ether of ethylene glycol in substantially 35 parts by volume, and a mixture, in approximately 15 parts by volume, of ortho toluene sulfonyl alkylamid and para toluene sulfonyl alkyl amid, the alkyl group in each case having less than 6 carbon atoms.

3. An operating liquid for fluid pressure apparatus consisting of castor oil in substantially 50 parts by volume, monoethyl ether of ethylene glycol in substantially 35 parts by volume, approximately 5 parts of an ortho toluene sulfonyl alkyl amid, 2½ parts of another ortho toluene sulfonyl alkyl amid, 5 parts of a para toluene sulfonyl alkyl amid, 2½ parts of another para toluene sulfonyl alkyl amid, (the alkyl groups of said amids having less than 6 carbon atoms), and an acidity neutralizing agent.

GEORGE L. DOELLING.